Oct. 17, 1967   J. F. SULLIVAN   3,347,540
SPRING ASSEMBLY
Filed Aug. 26, 1965
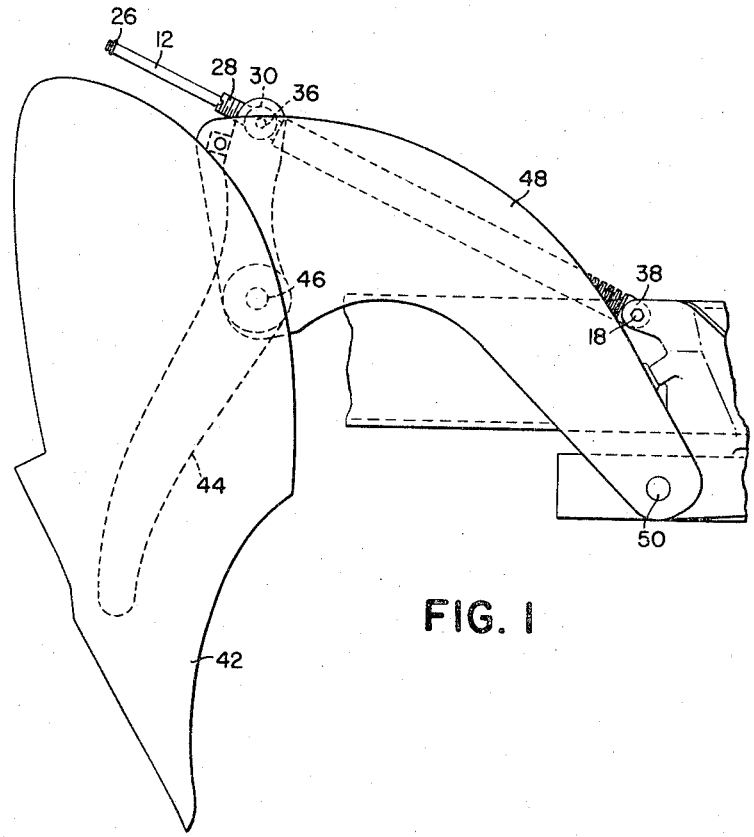
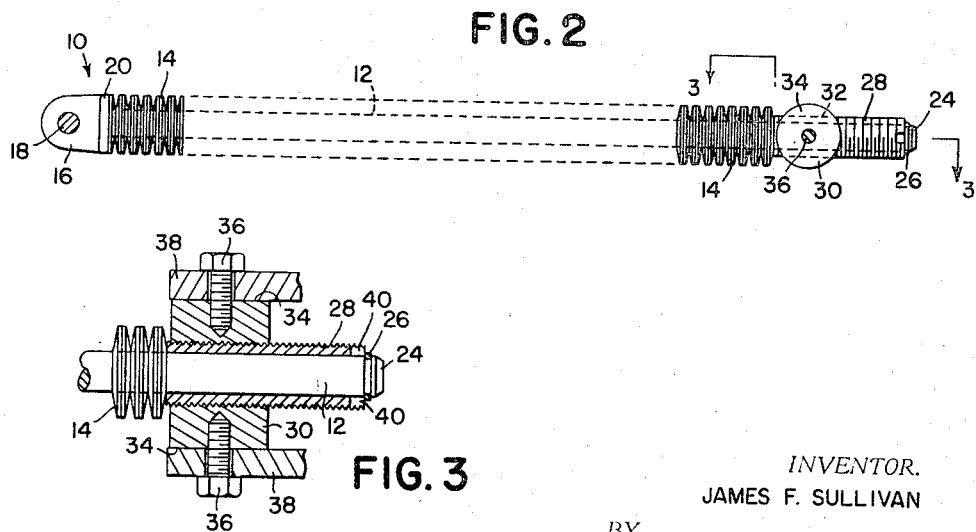
INVENTOR.
JAMES F. SULLIVAN
BY
John C. Thompson
ATTORNEY

United States Patent Office 3,347,540
Patented Oct. 17, 1967

3,347,540
SPRING ASSEMBLY
James F. Sullivan, East Moline, Ill., assignor to Deere & Company, Moline, Ill., a corporation of Delaware
Filed Aug. 26, 1965, Ser. No. 482,877
6 Claims. (Cl. 267—1)

ABSTRACT OF THE DISCLOSURE

A resilient assembly for mounting between two spaced apart structures which are mounted for movement towards one another, the resilient assembly being so constructed and arranged that it holds the structures apart under an adjustable preload but permits the structures to move together when the assembly is compressed upon the application of a compressive force greater than the initial preload.

The present invention relates to springs and more particularly to an assembly of conical or Belleville springs.

While Belleville springs are well known in the arts, they have not come into widespread usage even though a greater force can be developed in less linear space with Belleville springs than with conventional helical compression springs. One of the reasons why they are not in widespread usage is that the springs must be assembled in a predetermined order (generally every other one facing in an opposite direction) about a rod or shaft which holds them in alignment. Until the present, it has been necessary to place the springs about the rod at the place of final assembly. Since the springs are frequently assembled with a predetermined preload this may be a time-consuming and difficult job without special equipment.

According to this invention the Belleville springs are assembled about a novel stack rod at a central point of assembly, the springs being placed under a slight preload and the stack rod and spring assembly is then shipped to a point of final assembly where the unit is assembled onto the structure that is to be biased. If any further loading of the spring assembly is needed, provision is made for further loading.

It is therefore an object of the present invention to provide as assembly of Belleville springs whereby the assembled unit may easily be assembled into a desired location.

More particularly, it is an object of this invention to provide a stack rod having an abutment adjacent one end, a plurality of Belleville springs disposed about said stack rod, a sleeve rotatably disposed about the other end, the sleeve abutting the springs and carrying a member engageable with the structure to which the assembly is to be assembled, the member and the sleeve being relatively adjustable.

Another object of the present invention is to provide a Belleville spring assembly which is easy to assemble, gives varying preloads, is of high durability, and of relatively low cost.

These and other objects and advantages of this invention will be apparent to those skilled in the art after a consideration of the following detailed description, taken in conjunction with the accompanying drawings, in which the preferred form of this invention is illustrated.

FIG. 1 is a view showing the preferred structure associated with a plow.

FIG. 2 is an enlarged side view of the preferred structure.

FIG. 3 is a view taken along the line 3—3 in FIG. 2.

The assembly includes a stack rod, indicated generally at 10, which has an elongated rod portion 12 about which a plurality of Belleville springs 14 are disposed. A flattened portion 16 is formed at one end of the rod 10, the portion 16 being apertured for the receipt of a pivot bolt 18 or other conventional fastener. An abutment 20 having substantially the same diameter as the washers 14 is formed integrally on the rod between the rod portion 12 and the flattened portion 16.

The rod portion 12 is provided with a linear groove adjacent the end 24 remote from the abutment 20, the groove receiving a snap ring 26. Disposed between the ring 26 and the washers 14 is a tubular sleeve 28 which is provided with an external screw thread surface.

The washers are assembled on the rod portion 12 with an end washer in engagement with the abutment 20. After the desired number of washers have been assembled about the stack rod, a sleeve 28 of the proper length is selected and slipped about the rod and forced against the washers 14 to place them under the desired preload, at which time the snap ring 26 is placed in its groove to hold the sleeve and washers about the rod.

To hold the stack rod assembly in its final assembly and also to provide additional means for varying the loading of the springs, a nut 30 is provided. The nut illustrated in the drawings is in the form of a right cylindrical member which has a large threaded opening 32 formed about an axis parallel to the end surfaces 34 and substantially midway between for the reception of the sleeve 28. Each end of the nut 30 is provided with a threaded aperture for the reception of a bolt 36 whereby the nut may be secured to associated supporting structure.

To mount the assembly shown in the drawing upon the device which is to be spring biased, such as for example the plow shown in FIG. 1, it is only necessary to place a pivot bolt 18 or other suitable fastener carried by the plow within the aperture on the flattened portion 16, to rotate the nut 30 to its proper position wherein the apertures on the surfaces 34 are in alignment with opposed bolts carried by opposed side plates 38, and to thread the bolts within the openings 36. The side plates of the device that is to be spring biased will hold the nut from free rotation about the sleeve 28. If the preload upon the washers is not sufficient, additional preload can be effected after the nut is secured within the side plates by causing the sleeve to rotate within the nut. To this end applicant has provided two opposed slots 40 which may be engaged by the lugs of a spanner wrench.

The plow shown in FIG. 1 is of the type having a bottom 42 carried by a standard 44, the standard being pivotally secured at 46 to an intermediate member 48 which is in turn pivotally secured at 50 to a rigid plow frame structure. This form of plow is more fully described in copending application Ser. No. 482,824, entitled Plow Construction and filed on the same day as this application.

While the preferred construction in which the principles of the present invention have been incorporated is shown and described above, it is to be understood that the invention is not to be limited to the particular details, shown and described above, but that, in fact, widely different means may be employed in the practice of the broader aspects of the invention.

What is clamed is:

1. An assembly comprising: a stack rod having an apertured first end, an abutment shoulder formed adjacent the first end, a groove disposed adjacent the second end, a snap ring disposed within said groove, and an externally threaded sleeve disposed about said rod between said shoulder and said snap ring, a plurality of conical spring units disposed about said rod between said shoulder and said sleeve and held under load by said shoulder and said sleeve, said sleeve being in contact with said snap ring and a nut threaded about said sleeve, said nut being provided with means engageable by a structure remote from said assembly for securement to the structure.

2. A resilient assembly for mounting between two spaced apart structures which are mounted for movement towards one another, the resilient assembly being so constructed and arranged that it holds the structures apart under an adjustable preload but permits the structures to move together when the assembly is compressed upon the application of a compressive force greater than the initial preload, said assembly comprising: a rod, spring means disposed about said rod, first and second abutment means disposed about said rod and operable to hold said spring means about the rod under preload, at least one of said abutment means being freely movable towards the other of said structures, mounting means movable with said abutment means to secure the assembly to the two spaced apart structures, and means to vary the position of a least one of the mounting means relative to its associated abutment means whereby the initial preload may be varied after the resilient assembly has been secured to the two spaced apart structures.

3. A resilient assembly for mounting between two spaced apart structures which are mounted for movement towards one another, the resilient assembly being so constructed and arranged that it holds the structures apart under an adjustable preload but permits the structures to move together when the assembly is compressed upon the application of a compressive force greater than the initial preload, said assembly comprising: a rod, two abutment means on said rod, spring means about said rod and between said abutment means, one of said abutment means being fixed relative to said rod and the other of said abutment means being freely movable towards said one abutment to compress the spring means therebetween, means on the rod and cooperable with said abutment means to normally hold said spring means under preload, first mounting means fixed relative to said one abutment means and securable to one of said spaced apart structures, and second mounting means adjustably positionable on the other abutment means and securable to the other of the spaced apart structures, the second mounting means being adjustable relative to the other abutment means to vary the preload when the mounting means are secured to the spaced apart structures.

4. The resilient apparatus set forth in claim 3 in which said other abutment means comprises a sleeve slidable on said rod and having external threads.

5. The resilient assembly set forth in claim 4 in which said second mounting means comprises a nut threaded about said sleeve.

6. The resilient assembly set forth in claim 3 in which said means on the rod cooperable with the other abutment means comprises a snap ring disposed within a groove on said rod.

References Cited

UNITED STATES PATENTS 1,506,820  9/1924  Erdman et al. -------- 267—1
3,084,724  4/1963  Lattmer -------------- 267—1

ARTHUR L. LA POINT, *Primary Examiner.*

R. A. BERTSCH, *Assistant Examiner.*

UNITED STATES PATENT OFFICE
CERTIFICATE OF CORRECTION

Patent No. 3,347,540                  October 17, 1967

James F. Sullivan

It is hereby certified that error appears in the above numbered patent requiring correction and that the said Letters Patent should read as corrected below.

Column 3, line 13, before "structures," insert -- abutment means to permit compressive movement of said --; line 15, for "a" read -- at --; column 4, line 2, before "abutment" insert -- other --.

Signed and sealed this 31st day of December 1968.

(SEAL)
Attest:

Edward M. Fletcher, Jr.                EDWARD J. BRENNER
Attesting Officer                    Commissioner of Patents